United States Patent [19]
Cooney

[11] Patent Number: 5,480,222
[45] Date of Patent: Jan. 2, 1996

[54] AUTOMOTIVE HYDRAULIC BRAKING SYSTEM

[75] Inventor: Leo A. Cooney, Grosse Pointe, Mich.

[73] Assignee: Janel Hydro Co., Grosse Pointe Farms, Mich.

[21] Appl. No.: 432,915

[22] Filed: May 1, 1995

[51] Int. Cl.[6] .................................................. F15B 11/00
[52] U.S. Cl. .......................... 303/114.1; 91/535; 60/563; 60/591; 188/358
[58] Field of Search ................................ 91/535; 60/563, 60/591; 303/113.3, 114.1, 114.3, 113.4; 188/358

[56] References Cited

U.S. PATENT DOCUMENTS 4,976,190  12/1990  Cooney ........................................ 91/535
5,048,397   9/1991  Cooney ........................................ 91/535

Primary Examiner—Josie Ballato
Attorney, Agent, or Firm—Howard & Howard

[57] ABSTRACT

An automotive hydraulic braking system includes a pivoted brake lever coupled to a master hydraulic cylinder assembly which in turn is coupled by a brake line to a plurality of hydraulically actuatable calipers. A mechanical brake pressure intensifier is provided in-line between the master cylinder and the calipers. Pedal travel is controlled according to a developed formula to approximate preestablished industry standards set for conventional vacuum-assisted hydraulic braking systems.

3 Claims, 2 Drawing Sheets

AUTOMOTIVE HYDRAULIC BRAKING SYSTEM

This invention relates to hydraulic braking systems for automobiles and particularly to those having a mechanical brake pressure intensifying device arranged in line between or included within the master cylinder and the brake calipers of the system.

BACKGROUND OF THE INVENTION

Multi-stage hydraulic pressure boosters for use in vehicular braking systems are relatively well known in the prior art. Such pressure boosters, or intensifiers, employ a system of concentric pistons to obtain a gradual boost in wheel cylinder pressure, providing a brake pedal feel comparable to that provided by vacuum-power assisted vehicular braking systems. Such prior art pressure intensifiers are illustrated in U.S. Pat. Nos. 3,101,282 and 3,010,238 to Jansson, and in U.S. Pat. Nos. 3,425,222; 4,976,190; and 5,048,397 to Cooney. These references disclose a self-contained apparatus installed along the brake fluid line extending between the master cylinder or within the master cylinder housing and the wheel calipers of the vehicle. A cylindrical chamber surrounds two concentric pistons slidably disposed in the cylinder and urged by a compression spring toward a fluid inlet of the cylinder. A spring-loaded valve is disposed inside the inner piston and is held open by engagement with an abutment within the cylinder.

Application of pressure to the brake pedal by a user displaces hydraulic fluid from the master cylinder into the intensifier which initially passes directly through the intensifier into the caliper urging the brake pads into engagement with the rotating disk or rotor, or; in the case of drum brakes, with the drum. Once the brake pads engage, the resistance to further movement increases the hydraulic pressure throughout the system and at the inlet of the intensifier sufficiently to cause the pistons to move against the spring force thereby closing the valve, preventing any further flow through of fluid through the intensifier. The ratio between the inlet and outlet side of the pistons of the intensifier are such as to deliver greater hydraulic pressure to the caliper than the pressure exerted on the intensifier by the master cylinder, hence providing the desired boosting or intensifying effect.

SUMMARY OF THE INVENTION AND ADVANTAGES

The present invention is a hydraulic braking system of an automotive vehicle which improves the prior art described above by providing a formula to control various parameters of the system within prescribed limits to govern the amount of brake pedal travel needed to attain a predetermined braking pressure.

According to the invention, a brake pedal is mounted on support structure of the vehicle for pivotal travel ($T_p$) in an arc about an axis and has a free end that is spaced from the axis by a pedal distance $d_p$ for displacement by the foot of the user along an arc of the axis. A linkage is coupled to the foot pedal at a location spaced from the axis by a displacement distance $d_1$ less than the pedal distance $d_p$ defining a positive displacement ratio $d_p/d_1$ between the free end and the linkage.

The system has at least one hydraulically actuatable brake caliper with displaceable brake pads for engaging and applying a braking force to an adjacent rotating friction element of the vehicle. The caliper has a piston bore adjacent the brake pads in which a piston is slideably supported defining an axial space between the piston and its bore into which hydraulic fluid may be introduced to displace and actuate the brake pads. The caliper space has a known volumetric capacity, $V_c$, required to displace the piston a predetermined amount to achieve a predetermined braking force.

The system also has a master cylinder that is mounted on the support structure of the vehicle adjacent the pedal and includes a housing having a piston bore therein with a fluid inlet at one end in communication with a source of hydraulic fluid and including a fluid outlet at an opposite end. Supported slideably within the master cylinder bore is a piston that is coupled to an opposite end of the linkage and is provided with a face of predetermined area, $A_m$, for displacing hydraulic fluid out of the master cylinder through the outlet in response to displacement of the brake pedal.

A brake pressure intensifier device has a fluid cylinder provided with a fluid inlet communicating with the outlet of the master cylinder for receiving the hydraulic fluid displaced from the master cylinder into the intensifier and a fluid outlet communicating with the brake caliper space for conveying hydraulic fluid under pressure from the intensifier to the space. The intensifier has a first piston that is supported slideably within the cylinder and a second piston supported telescopically within the first piston. A flow passage extends axially through the pistons to provide open fluid communication between the inlet and outlet of the cylinder. The flow passage has a valve seat that communicates with an adjacent valve member supported within the cylinder and is urged by a valve spring acting between the valve member and the second piston toward biased sealing engagement with the valve seat. A piston spring acts between the cylinder and the second piston urging the valve member into engagement with an adjacent abutment opposite the valve spring and thereby forcing the valve member out of engagement with the valve seat in opposition to the spring force of the valve spring. This initially opens the flow passage and allows a predetermined volume of hydraulic fluid displaced by the master cylinder to pass through the intensifier into the space of the caliper in response to displacement of the brake pedal causing in turn a corresponding displacement of the brake pads into engagement with the rotating friction element and thereafter producing increased hydraulic pressure at the inlet of the intensifier sufficient to overcome the piston spring causing the second piston and valve member to be displaced out of engagement with the abutment to close the flow passage preventing further flow of hydraulic fluid through the flow passage and defining a remaining volume requirement of hydraulic fluid, $V_I$ to be supplied to the caliper space by the intensifier in order to achieve the predetermined braking pressure. The second piston has forward and rearward end face areas $A_f$, $A_r$ defining a positive output-to-input pressure intensification ratio, $A_f/A_r$, when the flow passage is closed, and wherein the amount of pedal travel, ($T_p$) of the brake pedal required to achieve the predetermined braking force is controlled by the formula:

$$T_p = [(V_c - V_I)A_f/A_r + V_I]d_p/(d_1 A_m)$$

A hydraulic brake system designed according to the above formula produces pedal travel within acceptable industry standards set for a conventional vacuum-assisted hydraulic braking systems.

THE DRAWINGS

Other advantages of the present invention will be readily appreciated as same becomes better understood by reference to the following detailed description when considered in connection with the accompanying drawings, in which.

DETAILED DESCRIPTION

Figure 1:
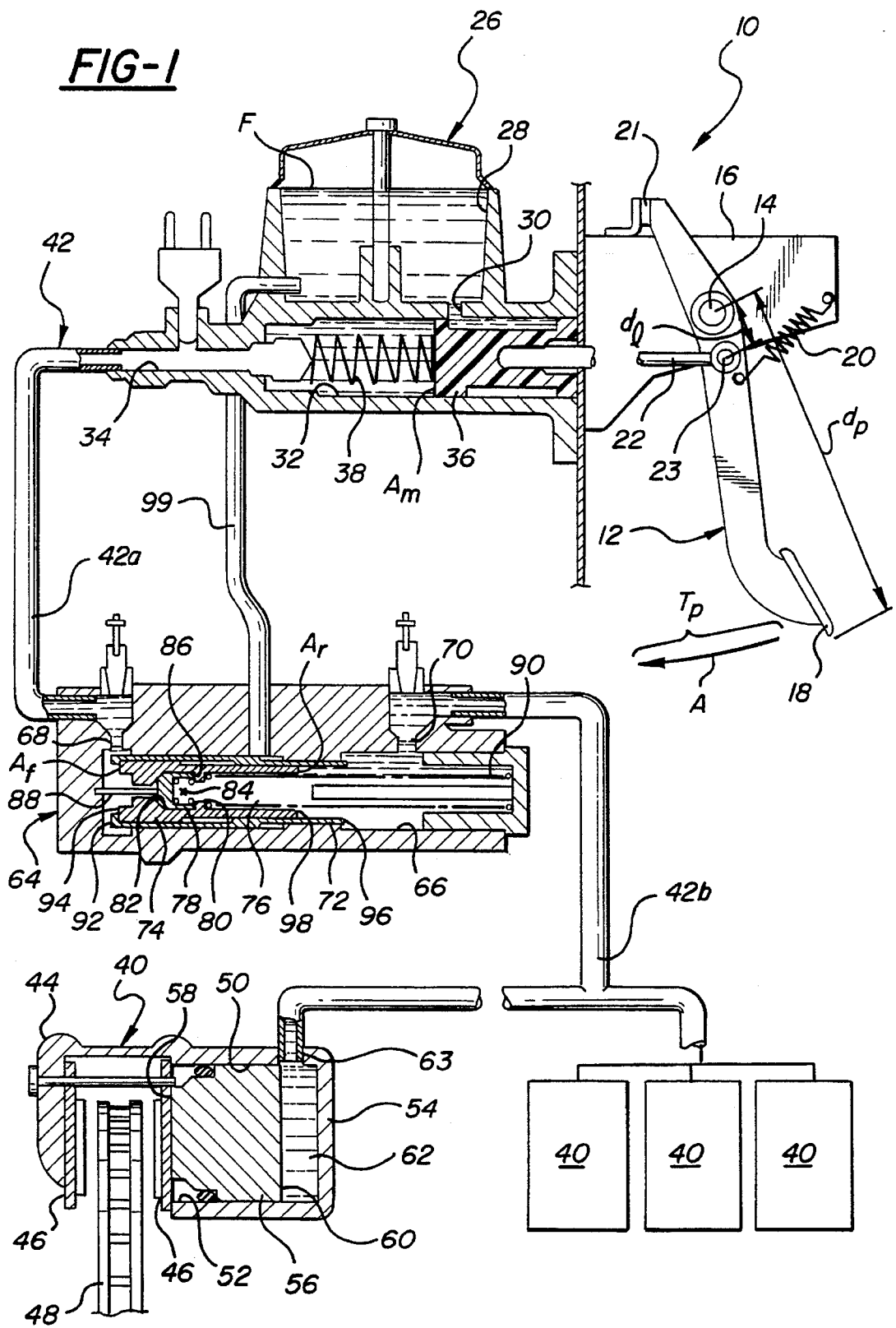
FIG. 1 is a schematic diagram, shown partly in section, of an automotive hydraulic braking system constructed according to this invention showing the brake calipers in an unactuated position.

Referring to FIG. 1, the braking system is shown generally at 10 and includes a brake pedal 12 pivotally attached about a pivot axis 14 to support structure 16 of an automotive vehicle. The brake pedal 12 extends from the pivot axis 14 to a free end 18 fitted with a foot pad. The free end 18 is spaced a predetermined pedal distance $d_p$ from the axis 14 and moveable about an arc of the axis 14 from the unactuated position shown in FIG. 1 along path A toward an actuated position. Return spring 20 acts in tension between the brake pedal 12 and the support structure 16 to urge the brake pedal 12 toward the unactuated position into engagement with a fixed stop member 21 of the structure 16.

A linkage in the preferred form of a push rod 22 has one end pivoted at 24 to the foot pedal 12 in spaced relation to the pivot axis 14 at a displacement distance $d_l$ relatively closer to the pivot axis 14 than the free end 18, defining a positive displacement ratio, $d_p/d_l$, between the free end 18 and the linkage 22 in known manner to provide a mechanical advantage to the displacement of the linkage 22 in relation to the free end 18.

A master cylinder assembly 26 is mounted on the support structure 16 of the vehicle adjacent the brake lever 12 and includes a hydraulic fluid F reservoir 28 disposed above and in fluid communication with an inlet 30 provided at one end of a cylinder 32 of the master cylinder device 26. A fluid outlet 34 is provided at an opposite end of the cylinder 32. A piston 36 is supported slideably within the cylinder 32 presenting a face having a predetermined contact area, $A_M$, for displacing the hydraulic fluid F out of the cylinder 30 when the piston 36 is slid along the cylinder 32 toward the outlet 34.

The push rod linkage 22 is coupled at its opposite end to the piston 36 so that as an operator applies pressure to the brake pedal 12, the piston 36 is caused to move within the cylinder 32 toward the outlet 34 thereby displacing hydraulic fluid out of the cylinder 32 through the outlet 34. A return spring 38 is disposed within the cylinder 32 and acts against the piston 36 to bias the piston 36 toward the unactuated position shown in FIG. 1.

The outlet 34 of the master cylinder device 26 is fluidly coupled to at least one, and preferably a plurality of hydraulically actuatable brake calipers 40 via a brake line 42. FIG. 1 illustrates that there are four such calipers 40 however, for purposes of simplicity, only one is shown in detail, with it being understood that the remaining calipers 40 (shown in block form) may be of the same or equivalent construction and operation as that to be described below.

The calipers 40 may comprise any of a number of well known types such as a drum or disc brake system in which the calipers 40 each include a cast body 44 supporting a pair of brake pad elements 46 displaceable toward and away from one another to engage and release, respectively, an adjacent rotating friction element 48, such as a drum or rotor to control braking. Those skilled in the art will readily appreciate that the invention will work equally well with drum brakes, automatic braking systems (ABS), and the like.

Each caliper body 44 is formed with a piston bore 50 having an open end 52 adjacent the brake pad elements 46 and a closed end 54 spaced from the open end 52. A piston 56 is supported slideably within the bore 50 having a front face 58 adjacent the brake pad elements 46 and a back face 60 adjacent the closed end 54 of the bore 50 defining an axial space or gap 62 therebetween. The space 62 has a hydraulic fluid inlet opening 63 coupled to the brake line 42 to receive hydraulic fluid under pressure into the space 62 in order to displace the piston 56 from an unactuated position shown in FIG. 1 in which the brake pads 46 are spaced out of engagement with the rotating element 48, to an actuated position, illustrated in FIG. 3, in which the brake pads 46 have been displaced by the piston 56 into engagement with the rotating element 48 and further urged by the piston 56 against the rotating element 48 to achieve a predetermined braking force (e.g., 1000 PSI) of the calipers 40.

Figure 3:
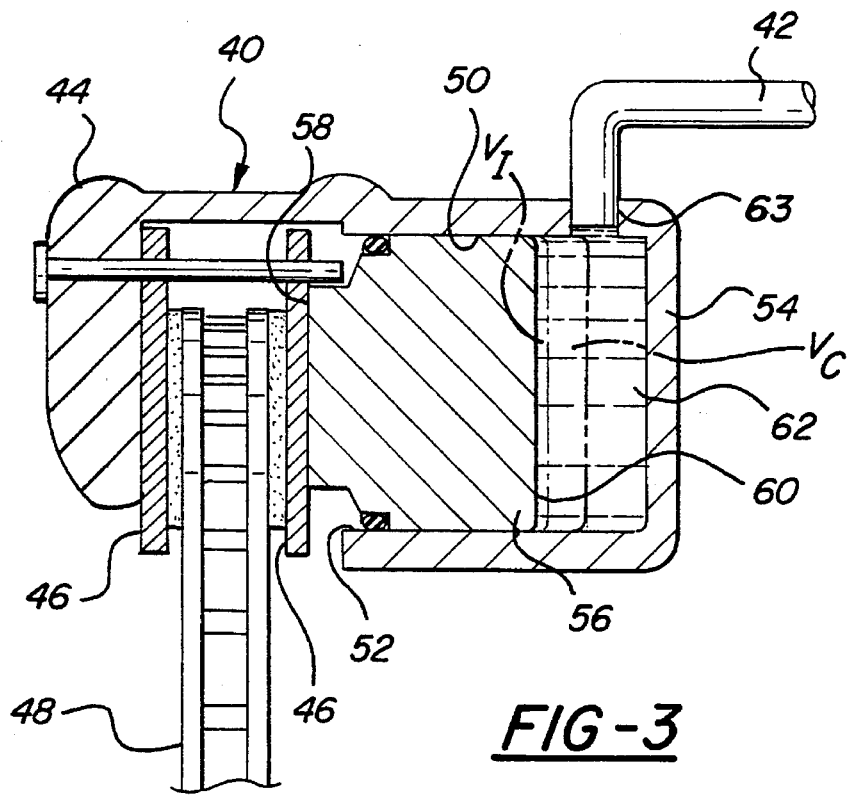
FIG. 3 is a view like FIG. 2 but showing the brake pads forced further toward the rotor to a fully actuated position to apply a predetermined braking force.

The calipers 40 have a characteristic combined volumetric capacity of the spaces, $V_c$, known to be required to produce the desired predetermined braking force. In other words, a certain combined volume $V_c$ of the hydraulic fluid F must be introduced into the spaces 62 of the calipers 40 to move the pistons 56 and hence the brake pad elements 46 from the unactuated position of FIG. 1 to the fully actuated position of FIG. 3 in order to attain the desired braking force. In FIG. 3, the right most phantom line indicates the unactuated position of the piston back face 60 as shown in FIG. 1.

A hydraulic brake pressure intensifier device 64 is arranged in-line between the master cylinder assembly 26 and the brake calipers 40 or may be incorporated into the master cylinder as a unit. The intensifier 64 is preferably of the type disclosed in the aforementioned U.S. Pat. Nos. 4,976,190 and 5,048,397, incorporated herein by reference. In view of the detailed disclosures provided by these patents, only a brief description of the intensifier 64 will be provided below.

The intensifier 64 includes a fluid cylinder 66 having a fluid inlet 68 at an inlet end coupled to a section of the brake line 42a extending between the outlet 34 of the master cylinder 26 and the inlet 68 of the intensifier 64 for receiving the hydraulic fluid displaced from a master cylinder 28 into the cylinder 66 of the intensifier 64, and including an outlet 70 at an opposite outlet end of the cylinder 66 communicating with each of the caliper spaces 62 through a second section 42b of the brake line for conveying hydraulic fluid under pressure into the space 62 of each caliper 40.

As described more fully in the aforementioned incorporated patents, the intensifier 62 includes a first outer piston 72 slideably supported within the cylinder 66 and a second inner piston 74 also disposed in the cylinder in sliding, telescoping engagement within the first piston 72. A flow passage 76 extends axially through the pistons 74 and 76 to provide open fluid communication between the inlet 68 and outlet 70 of the cylinder 66. A valve member 78 is disposed in the flow passage 76 within a pocket 80 of the second piston 74 in adjacent relationship to a valve seat 82 of the flow passage 76. A valve spring 84 is disposed in the pocket 80 and acts in compression between the valve member 78 and a spring seat 86 of the second piston 74 to urge the valve member 78 with predetermined force toward sealing engagement with the valve seat 82, such that when seated, hydraulic fluid is prevented from flowing through the passage 76.

An abutment, in the preferred form of a pin 88, projects axially into the flow passage 76 from the inlet end of the cylinder 66 presenting a free end adjacent the side of the valve member 78 opposite the valve spring 84. A piston spring 90 is disposed within the cylinder 66 and acts between the second piston 74 and the outlet end of the cylinder 66 to bias the second piston 74 and the valve member 78 as a unit toward the inlet end of the cylinder 66 with a counteracting force exceeding that provided by the valve spring 84 to urge the valve member 78 against the abutment 88 and out of engagement with the valve seat 82, to initially open the flow passage 76. The open condition of the flow passage 76 allows a predetermined volume of the hydraulic fluid F to pass through the intensifier 64 when a user depresses the free end 18 of the foot pedal 12 in the direction of arrow A (FIG. 1), thereby displacing the piston 32 of the master cylinder 26 and forcing hydraulic fluid F out of the master cylinder 26, through the intensifier 64, and into the spaces 62 of the calipers 40, causing the caliper pistons 56 and brake pads 46 to be displaced from the initial unactuated position shown in FIG. 1, toward and into initial engagement with the rotating element 48, as illustrated in FIG. 2.

Figure 2:
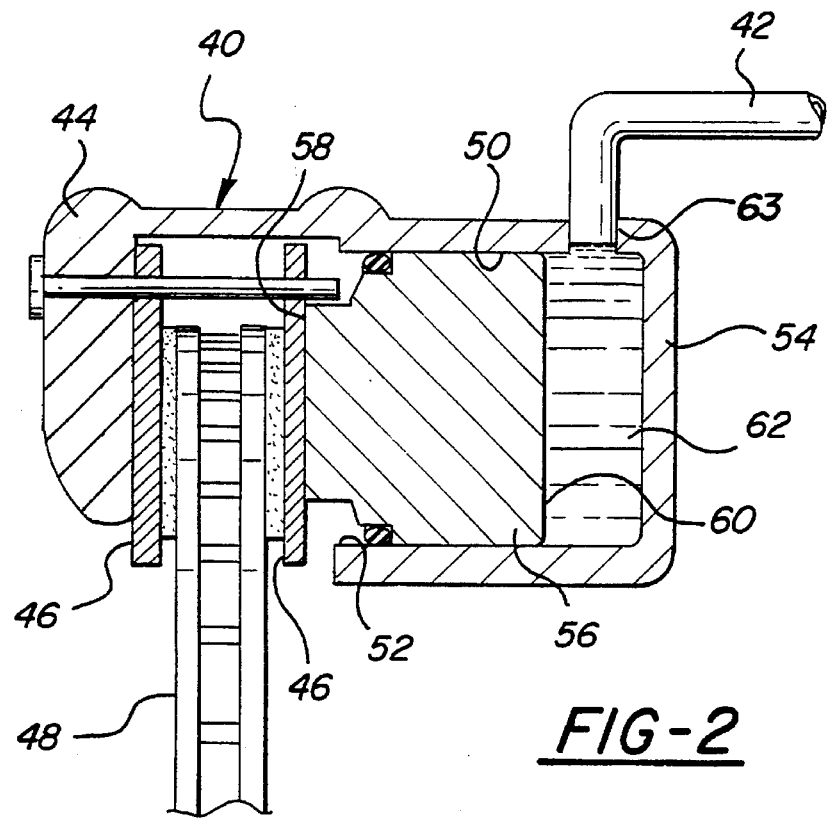
FIG. 2 is an enlarged fragmentary section view of one of the brake calipers showing the brake pads moved into engagement with the rotor.

Once having engaged the rotating element 48, it takes an additional remaining volume requirement hydraulic fluid, $V_I$, (shown exaggerated in FIG. 3 where the left most phantom line indicates the piston back face 60 in FIG. 2) that must be provided to the calipers 40 in order to urge the brake pad elements 46 with greater intensity against the rotating element 48 to achieve the predetermined braking force (illustrated by a comparison of FIGS. 2 and 3). Forcing the brake pad elements 46 further against the rotating element 48 causes an increase in hydraulic fluid pressure to develop throughout the system and at the inlet 68 of the intensifier 64 which in turn exerts a force on the inlet side of the pistons 72 and 74 that exceeds the counteracting force of the piston spring 90 and causes the second piston 74 and the valve member 78 to be displaced as a unit out of engagement with the abutment 88. The valve spring 84 thereafter urges the valve member 78 into sealing engagement with the valve seat 82 causing the flow passage 76 to become closed preventing any further flow of hydraulic fluid through the flow passage 76. Thus, when the valve member 82 seats to close the flow passage 76, the calipers 40 are in the engaged condition (FIG. 2 position) and require the remaining additional known remaining quantity of hydraulic fluid V to achieve the predetermined braking force (FIG. 3 position).

As explained fully in the aforementioned incorporated patents, the purpose of the intensifier 64 is to controllably or smoothly increase or boost the line pressure of the hydraulic fluid that exits the intensifier 64 through the outlet 70 in comparison to the relatively lower pressure of the hydraulic fluid entering the intensifier at outlet 68. The intensifier 64 is able to produce the pressure boost by providing the inner second piston 74 at its inlet side with a forward end face 94 having a forward end face area $A_f$ and a rearward end face 98 having a rearward end face area $A_r$ at its outlet side defining a positive output-to-input pressure intensification ration $A_f/A_r$. In this way, the output pressure delivered by the intensifier 64 is relatively greater than the input pressure to the intensifier 64 from the master cylinder 26.

It has been found that the amount of displacement or pedal travel, $T_p$, of the free end 18 of the pedal 12 in the direction of arrow A necessary to achieve the predetermined braking force at the calipers 40 can be controlled according to the formula:

$$T_p = [(V_c - V_I)A_f/A_r + V_I]d_p/(d_lA_m)$$

and is optimized when $A_f/A_r$ is between 1.5 and 3.0 and when $A_m$ is between 0.196 and 7,096. Such a hydraulic braking system constructed according to the above formula results in pedal travel values $T_p$ that are comparable to acceptable industry standards established for conventional hydraulic braking systems not employing a mechanical hydraulic brake pressure intensifier.

The disclosed embodiment is representative of a presently preferred form of the invention, but is intended to be illustrative rather than definitive thereof. The invention is defined in the claims.

I claim:

1. A hydraulic braking system for an automotive vehicle, comprising:

a brake pedal (12) mounted on support structure (16) of the vehicle for pivotal travel ($T_p$) in an arc about an axis (14), said brake pedal (12) having a free end (18) spaced a pedal distance ($d_p$) from said axis (14) for displacement by the foot of a user along an arc of said axis (14), and a linkage (22) coupled to said brake pedal (12) at a location spaced from said axis (14) by a displacement distance ($d_l$) less than said pedal distance ($d_l$) and defining a positive displacement ratio ($d_p/d_r$) between said free end (18) and said linkage (22);

at least one hydraulically actuatable brake caliper (40) having displaceable brake pad elements (46) for engaging and applying a braking force to an associated adjacent rotatable friction element (48) of the vehicle, said brake caliper (40) having a piston bore (50) adjacent said brake pad elements (46) and an actuating piston (56) supported slideably within said piston bore (50) defining an axial space (62) between said piston (56) and said bore (50) into which hydraulic fluid may be introduced to displace said piston (56) and actuate said brake pad elements (46), said space (62) having a known volumetric capacity, $V_c$, required to displace said piston (56) and said brake pad element (46) a predetermined amount to provide a predetermined braking force;

a master cylinder device (26) mounted on said support structure (16) adjacent said brake pedal (12), said master cylinder device (26) including a reservoir (28) of hydraulic fluid (F) and a cylinder (32) having a bore fluid inlet (30) at one end coupled to said reservoir (28) and a fluid outlet (34) at an opposite end of said cylinder (32), said master cylinder device (26) including a piston (36) supported slideably within said cylinder (32) and coupled to said linkage (22) and having a face presenting a contact area, $A_m$, for displacing hydraulic fluid (F) out of said cylinder (32) through said outlet (34) in response to displacement of said piston (36) by said brake pedal (12) and said linkage (22);

a brake pressure intensifier device (64) having a fluid cylinder (66) provided with a fluid inlet (68) communicating with said outlet (34) of said master cylinder device (26) for receiving the hydraulic fluid (F) displaced from said master cylinder device (26) into said intensifier (64) and a fluid outlet (70) communicating with said brake caliper space (62) for conveying hydraulic fluid (F) under pressure to said space (62), said intensifier (64) including a first piston (72) slideably supported within said cylinder (66) and a second piston (74) telescopically disposed within said first piston (72) and a flow passage (76) extending axially through said first (72) and second (74) pistons to provide open fluid communication between said inlet (68) and said outlet (70) of said cylinder (66) and having a valve seat (82), a valve member (78) supported within said cylinder (66) adjacent said valve seat (82) and a valve spring (84) acting between said valve member (78) and said second piston (74) to bias said valve member (78) toward sealing engagement with said valve seat (82), an abutment (88) adjacent said valve member (78) opposite said valve spring (84), a piston spring (90) urging said second piston (74) in the direction of said spring force and forcing said valve member (78) against said abutment (88) and out of engagement with said valve seat (82) in opposition to the force of said valve spring (84) to initially open said flow passage (76) allowing a predetermined volume of hydraulic fluid (F) displaced by said master cylinder device (26) to pass through said intensifier (64) into said caliper space (62) in response to displacement of said brake pedal (12) causing corresponding displacement of said brake pad element (46) into engagement with said rotating friction elements (48) and thereafter producing increased hydraulic pressure at said inlet (68) of said intensifier (64) exceeding the counteracting spring force exerted by said piston spring (90) causing said second piston (74) and said valve member (78) to be displaced out of engagement with said abutment (88) to close said flow passage (76) preventing further flow of hydraulic fluid through said flow passage and defining a remaining volume requirement of hydraulic fluid, $V_I$, to be supplied to said caliper space (62) by said intensifier (64) to achieve said predetermined braking force, said second piston (74) having a forward end face area ($A_f$) and a rearward end face area ($A_r$) defining a positive output-to-input pressure intensification ratio, $A_f/A_r$ when said flow passage (76) is closed, and wherein an amount of pedal travel, ($T_p$), of said brake pedal (12) required to achieve said predetermined braking force is controlled by the formula:

$$T_p = [(V_c - V_I)A_f/A_r + V_I]d_p/(d_tA_m)$$

2. The braking system of claim 1, wherein $A_f/A_r$ is between 1.5 and 3.0.

3. The braking system of claim 1 or 2, wherein $A_m$ is between 0.196 and 7.096.

* * * * *